US012683086B2

(12) United States Patent
Kobayashi et al.

(10) Patent No.: US 12,683,086 B2
(45) Date of Patent: Jul. 14, 2026

(54) ELECTROLYTIC CAPACITOR

(71) Applicant: Panasonic Intellectual Property Management Co., Ltd., Osaka (JP)

(72) Inventors: Takehiro Kobayashi, Osaka Fu (JP); Kazuhiro Takatani, Hyogo Ken (JP); Hiroyuki Arima, Osaka Fu (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 153 days.

(21) Appl. No.: 18/841,220

(22) PCT Filed: Feb. 20, 2023

(86) PCT No.: PCT/JP2023/005923
§ 371 (c)(1),
(2) Date: Aug. 23, 2024

(87) PCT Pub. No.: WO2023/162914
PCT Pub. Date: Aug. 31, 2023

(65) Prior Publication Data
US 2025/0191849 A1     Jun. 12, 2025

(30) Foreign Application Priority Data

Feb. 28, 2022     (JP) ................................ 2022-030095

(51) Int. Cl.
*H01G 9/025*          (2006.01)
*H01G 9/035*          (2006.01)
(52) U.S. Cl.
CPC ............. *H01G 9/025* (2013.01); *H01G 9/035* (2013.01)

(58) Field of Classification Search
CPC ............................... H01G 9/025; H01G 9/035
See application file for complete search history.

(56) References Cited

U.S. PATENT DOCUMENTS

2012/0300368 A1     11/2012  Matsuura et al.
2014/0092529 A1      4/2014  Nobuta et al.
(Continued)

FOREIGN PATENT DOCUMENTS

JP          2021-036603 A       3/2021
JP          2021-195437 A      12/2021
(Continued)

OTHER PUBLICATIONS

International Search Report dated May 16, 2023 issued in International Patent Application No. PCT/JP2023/005923, with English translation.

*Primary Examiner* — Michael P McFadden
(74) *Attorney, Agent, or Firm* — Rimon P.C.

(57)          ABSTRACT

Provided is an electrolytic capacitor including a capacitor element and a liquid component. The capacitor element includes an anode foil having a dielectric layer on a surface of the anode foil, and a conductive polymer component in contact with at least a portion of the dielectric layer. The conductive polymer component contains a self-doped conductive polymer. A difference $\Delta HSP1$ between a Hansen solubility parameter $HSP_p$ of the self-doped conductive polymer and a Hansen solubility parameter $HSP_e$ of the liquid component is 9.0 $MPa^{0.5}$ or more and 11.4 $MPa^{0.5}$ or less.

5 Claims, 2 Drawing Sheets

(56) References Cited

U.S. PATENT DOCUMENTS

| | | | |
|---|---|---|---|
| 2015/0255221 A1 | 9/2015 | Asteman et al. | |
| 2015/0325831 A1* | 11/2015 | Dennes | H01M 50/489 |
| | | | 429/144 |
| 2017/0330690 A1* | 11/2017 | Doi | H01G 4/30 |
| 2020/0373089 A1* | 11/2020 | Shi | H01G 9/028 |
| 2022/0367120 A1 | 11/2022 | Arima et al. | |

FOREIGN PATENT DOCUMENTS

| | | | |
|---|---|---|---|
| WO | 2011/099261 A1 | 8/2011 | |
| WO | 2012/117994 A1 | 9/2012 | |
| WO | 2013/024886 A1 | 2/2013 | |
| WO | 2021/153752 A1 | 8/2021 | |

* cited by examiner

ELECTROLYTIC CAPACITOR

CROSS-REFERENCE TO RELATED APPLICATIONS

This application is the U.S. National Phase under 35 U.S.C. § 371 of International Patent Application No. PCT/JP2023/005923, filed on Feb. 20, 2023, which in turn claims the benefit of Japanese Patent Application No. 2022-030095, filed on Feb. 28, 2022, the entire disclosures of which Applications are incorporated by reference herein.

TECHNICAL FIELD

The present disclosure relates to an electrolytic capacitor.

BACKGROUND ART

A capacitor element included in an electrolytic capacitor includes, for example, an anode body, a dielectric layer formed on a surface of the anode body, and a cathode portion covering at least a portion of the dielectric layer. The cathode portion includes a conductive polymer covering at least a portion of the dielectric layer. The conductive polymer is also called a solid electrolyte. For example, PTL 1 proposes forming a solid electrolyte layer of a solid electrolytic capacitor using a conductive polymer solution containing a conductive polymer, polysulfonic acid or a salt thereof that functions as a dopant, a mixture of a polyacid and a carbon material, and a solvent.

An electrolytic capacitor in which a capacitor element having a solid electrolyte layer and a liquid component such as electrolytic solution are housed in a case is also seen as promising as a capacitor that is small, has a large capacity, and has a low equivalent series resistance (ESR). For example, PTL 2 proposes an electrolytic capacitor that includes a capacitor element, an electrolytic solution impregnated in the capacitor element, and an exterior body that seals the capacitor element together with the electrolytic solution, in which the electrolytic solution contains a low volatile solvent that is at least one of polyalkylene glycol and a derivative of polyalkylene glycol.

Further, in some cases, a self-doped conductive polymer is used as the solid electrolyte. For example, PTL 3 proposes a capacitor in which the anode body is at least partially coated with a solid electrolyte including a foreign-doped conductive polymer, counterions not covalently bonded to the foreign-doped conductive polymer, and a self-doped conductive polymer.

CITATION LIST

Patent Literature

PTL 1: WO 2012/117994 (claims 1, 13, and 16)
PTL 2: WO 2011/099261 (claim 1)
PTL 3: Japanese Laid-Open Patent Publication No. 2021-36603 (claim 14)

SUMMARY OF INVENTION

Technical Problem

There is desire for an electrolytic capacitor to have a low initial ESR and a small change in ESR over time (ΔESR).

Solution to Problem

A first aspect of the present disclosure relates to an electrolytic capacitor including a capacitor element and a liquid component, in which the capacitor element includes an anode foil having a dielectric layer on a surface of the anode foil, and a conductive polymer component in contact with at least a portion of the dielectric layer, the conductive polymer component contains a self-doped conductive polymer, and a difference $\Delta HSP1$ between a Hansen solubility parameter $HSP_p$ of the self-doped conductive polymer and a Hansen solubility parameter $HSP_e$ of the liquid component is $9.0$ $MPa^{0.5}$ or more and $11.4$ $MPa^{0.5}$ or less.

Advantageous Effects of Invention

In the electrolytic capacitor, the initial ESR and the change in ESR over time can be kept low.

DESCRIPTION OF EMBODIMENTS

Figure 1:
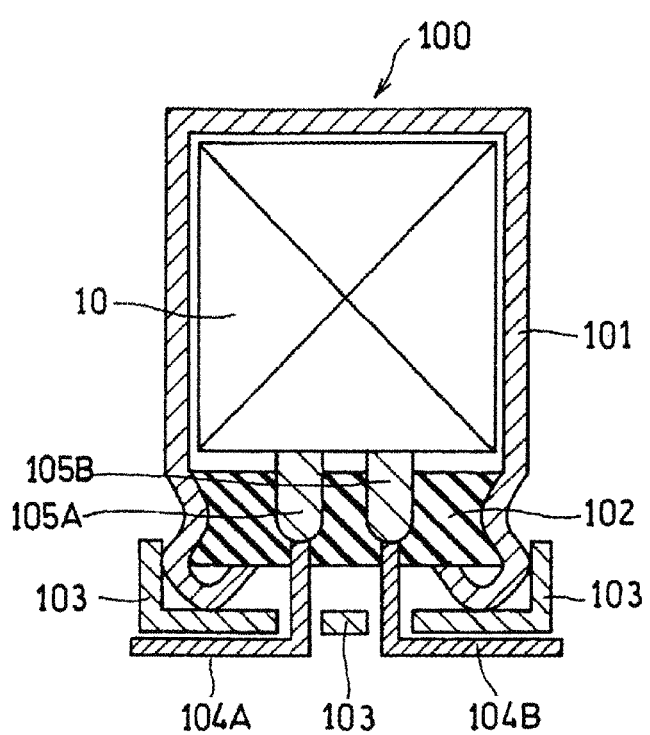
FIG. 1 is a schematic sectional view of an electrolytic capacitor according to an embodiment of the present disclosure.

Novel features of the present invention are set forth in the appended claims, but the present invention, both in terms of structure and content, together with other objects and features of the present invention, will be better understood from the following detailed description taken in conjunction with the drawings.

In electrolytic capacitors, for example, using a conductive polymer component (such as a conjugated polymer and a dopant) having high conductivity is advantageous in terms of keeping the initial ESR low. Further, combining the conductive polymer component with an electrolytic solution reduces deterioration of the conductive polymer component, and thus is advantageous in terms of suppressing an increase in the ESR of the electrolytic capacitor. However, when the conductive polymer component contains the conjugated polymer and the dopant, de-doping occurs and the conjugated polymer after de-doping decomposes during repeated use. Therefore, it is difficult to suppress a reduction in the conductivity of the conductive polymer component over time. Therefore, it is difficult to suppress an increase in ESR over time.

On the other hand, a self-doped conductive polymer has a skeleton of the conjugated polymer and a functional group (such as an anionic group) that function as a dopant bonded directly or indirectly to this skeleton by covalent bonds. Therefore, when a self-doped conductive polymer is used, high conductivity can be obtained and it is difficult to occur de-doping, which occurs when a conjugated polymer and a dopant are used, and thus the conductivity is also less likely to decrease over time. Therefore, it is expected that the initial ESR and a change in ESR over time can be kept low. In a solid electrolytic capacitor, by using a self-doped conductive polymer, the initial ESR and the change in ESR over time can be kept low.

Thus, a self-doped conductive polymer is a material with excellent performance. However, when a self-doped conductive polymer is combined with a liquid component such as an electrolytic solution, unlike the case of a solid electrolytic capacitor, the initial ESR cannot be sometimes kept low, and the change in ESR over time may sometimes increase. Therefore, conventionally, when the liquid component is used, it has been difficult to obtain an electrolytic capacitor that has practical performance even when the self-doped conductive polymer is used. When the self-doped conductive polymer is combined with the liquid component, the initial increase in ESR and increase in ESR over time are thought to be due to dissolution of the self-doped conductive polymer in the liquid component. In the conductive polymer component containing the conjugated polymer and the dopant, presence of a dopant molecule increases orientation of the conjugated polymer, resulting in high crystallinity, and thus the conductive polymer component is rigid. Even when such a rigid conductive polymer component is in contact with the liquid component, it does not easily dissolve. However, in the self-doped conductive polymer, polymer chains are relatively flexible, the positions of functional groups such as anionic groups are random, and the orientation of the polymer chains is low, resulting in low crystallinity. Therefore, it is thought that the self-doped conductive polymer has a high affinity for the liquid component and easily dissolves in the liquid component.

In view of the above, (1) the electrolytic capacitor of the present disclosure includes a capacitor element and a liquid component. The capacitor element includes an anode foil having a dielectric layer on a surface of the anode foil, and a conductive polymer component in contact with at least a portion of the dielectric layer. The conductive polymer component contains a self-doped conductive polymer. A difference $\Delta HSP1$ between a Hansen solubility parameter $HSP_p$ of the self-doped conductive polymer and a Hansen solubility parameter $HSP_e$ of the liquid component is 9.0 $MPa^{0.5}$ or more and 11.4 $MPa^{0.5}$ or less.

Thus, in the electrolytic capacitor of the present disclosure, the difference $\Delta HSP1$ between the Hansen solubility parameter $HSP_p$ of the self-doped conductive polymer contained in the conductive polymer component and the Hansen solubility parameter $HSP_e$ of the liquid component is 9.0 $MPa^{0.5}$ or more and 11.4 $MPa^{0.5}$ or less. By setting the $\Delta HSP1$ to 9.0 $MPa^{0.5}$ or more, it is possible to suppress dissolution of the self-doped conductive polymer in the liquid component, even though the self-doped conductive polymer is combined with the liquid component. Therefore, a conductive path in the conductive polymer component is maintained and high conductivity is obtained. In addition, by setting the $\Delta HSP1$ to 11.4 $MPa^{0.5}$ or less, the conductive polymer component can become sufficiently swollen with the liquid component, so that high conductivity can be ensured. As a result, the initial ESR and the change in ESR over time (more specifically, the increase in ESR when the electrolytic capacitor is used repeatedly) can be kept low. When the $\Delta HSP1$ is less than 9.0 $MPa^{0.5}$, the conductive polymer component easily becomes swollen with the liquid component, but since the affinity between the self-doped conductive polymer and the liquid component is high, the self-doped conductive polymer easily dissolves significantly in the liquid component. When the $\Delta HSP1$ is more than 11.4 $MPa^{0.5}$, dissolution of the self-doped conductive polymer in the liquid component is suppressed, but since swelling properties of the self-doped conductive polymer due to the liquid component is low, it is difficult to ensure an effect of improving conductivity or a film repair effect of the dielectric layer by using the liquid component.

The Hansen solubility parameter (hereinafter appropriately referred to as "HSP") is an index that indicates solubility (wettability) between materials, and is expressed as a three-dimensional vector of a London dispersion force term ($\delta d$), dipole-dipole force term ($\delta p$), and hydrogen bonding force term ($\delta h$). When the solubility of a material is expressed as position coordinates in a three-dimensional space ($\delta d$, $\delta p$, $\delta h$), the compatibility of materials is higher as the distance (HSP distance) between the materials in the three-dimensional space is closer.

Here, the London dispersion force is an attractive force that occurs due to imbalance of electric charges in molecules in a small time period, and is equivalent to the van der Waals force in a nonpolar molecule. The solubility due to the London dispersion force is $\delta d$. The dipole-dipole force is an attractive force that acts between dipoles of molecules (polar molecules) with a dipole moment, and the solubility due to the dipole-dipole force is $\delta p$. The hydrogen bonding force is a strong intermolecular force that occurs when a hydrogen atom, which is positively charged due to covalent bonding with a highly electronegative atom, attracts another electronegative atom to an equilibrium distance close to the radius of an anion. The solubility due to hydrogen bonding force is $\delta h$.

As for $HSP_p$ of the self-doped conductive polymer and $HSP_e$ of the liquid component, $HSP_p$ usually has a larger value. Therefore, $\Delta HSP1$ is expressed as $\Delta HSP1=HSP_p-HSP_e$.

(2) In the above (1), a difference $\Delta HSP2$ between the Hansen solubility parameter $HSP_p$ and a Hansen solubility parameter $HSP_f$ of the anode foil having the dielectric layer may be 10 $MPa^{0.5}$ or more and 16 $MPa^{0.5}$ or less.

(3) In the above (1) or (2), the anode foil may contain aluminum.

(4) In any one of the above (1) to (3), the self-doped conductive polymer may contain at least a sulfo group.

(5) In any one of the above (1) to (4), the capacitor element may include a cathode foil and a separator interposed between the anode foil and the cathode foil. The conductive polymer component may be impregnated in the separator.

The electrolytic capacitor of the present disclosure, including the above (1) to (5), will be described in more detail below. To the extent that there is no technical contradiction, at least one of the above (1) to (5) may be combined with at least one of elements described below.

(Capacitor Element)

The capacitor element included in the electrolytic capacitor includes at least the anode foil having the dielectric layer on a surface thereof and the conductive polymer component in contact with at least a portion of the dielectric layer.

(Anode Foil)

The anode foil can contain a valve metal, an alloy containing the valve metal, and a compound containing the valve metal. These materials can be used alone or in combination of two or more. As the valve metal, for example, aluminum, tantalum, niobium, or titanium is preferably used.

Among such metals, aluminum is often used for the anode foil of the capacitor element because aluminum is inexpensive, lightweight, and highly conductive. However, when the liquid component is used, the anode foil containing aluminum is easily corroded by an anionic group contained in the conductive polymer component, an acid component contained in the liquid component, or the like. In the present disclosure, even when the anode foil containing aluminum is used, when the difference $\Delta HSP2$ between the $HSP_p$ of the self-doped conductive polymer and the solubility parameter $HSP_f$ of the anode foil having the dielectric layer is within a range described below, dissolution of the anode foil is suppressed and corrosion can be suppressed. The anode foil containing aluminum may contain aluminum metal, an aluminum alloy, or both.

The anode foil may have a porous portion having pores at a surface layer. The anode foil having the porous portion can be obtained, for example, by roughening a surface of a substrate (such as a foil-like or plate-like substrate) containing the valve metal by etching or the like. The roughening may be performed by, for example, electrolytic etching or chemical etching.

(Dielectric Layer)

The dielectric layer is formed by anodizing the valve metal on the surface of the anode foil by chemical conversion treatment or the like. The dielectric layer is formed so as to cover at least a portion of the anode foil.

The dielectric layer contains an oxide of the valve metal. For example, when tantalum is used as the valve metal, the dielectric layer contains $Ta_2O_5$, and when aluminum is used as the valve metal, the dielectric layer contains $Al_2O_3$. Note that the dielectric layer is not limited to this and may be any layer that functions as a dielectric.

The dielectric layer is usually formed on the surface of the anode foil. When the dielectric layer is formed on the surface of the porous portion of the anode foil, the dielectric layer is formed along inner wall surfaces of pores in the porous portion and of recesses (pits) in the surface of the anode foil.

The mode value of the volume-based pore diameter of the anode foil having the dielectric layer may be, for example, 0.1 μm or more and 0.5 μm or less. The mode value of the pore diameter may be 0.1 μm or more and 0.3 μm or less. In such a case, the self-doped conductive polymer can easily penetrate into the pores formed in the anode foil having the dielectric layer, to obtain a high capacity. Further, the self-doped conductive polymer is less likely to dissolve, and thus a change in capacity over time can be reduced. In addition, connection points between particles of the self-doped conductive polymer are maintained, thereby maintaining high conductivity, and thus the change in ESR over time can be further reduced.

The mode value of the volume-based pore diameter of the anode foil having the dielectric layer is the mode value (mode diameter) when pore diameters of the pores with a pore diameter of 10 μm or less are measured in a volume-based pore diameter distribution measured using a mercury porosimeter. When measuring the pore diameter distribution using a mercury porosimeter, the anode foil is removed from the capacitor element, the conductive polymer component adhering to the anode foil is removed using a solvent (ethanol), and the resulting anode foil is cut to a predetermined size (5 mm length×5 mm width) to obtain a sample.

(Conductive Polymer Component)

The conductive polymer component contains the self-doped conductive polymer. The conductive polymer component is in contact with at least a portion of the dielectric layer. The conductive polymer component in contact with a surface of the dielectric layer may form a layer (sometimes referred to as a conductive polymer layer). The conductive polymer component forms at least a portion of a cathode body in the electrolytic capacitor. The conductive polymer component may contain at least one of another conjugated polymer (such as a non-self-doped conjugated polymer) and a dopant, as necessary. The conductive polymer component may contain an additive, as necessary.

The difference ΔHSP1 between the $HSP_p$ of the self-doped conductive polymer and the $HSP_e$ of the liquid component is 9.0 $MPa^{0.5}$ or more and 11.4 $MPa^{0.5}$ or less, and may be 9.0 $MPa^{0.5}$ or more and 10.5 $MPa^{0.5}$ or less (or 10 $MPa^{0.5}$ or less). When the ΔHSP1 is in such a range, even when the self-doped conductive polymer is combined with the liquid component, it is possible to suppress dissolution of the self-doped conductive polymer in the liquid component, and ensure high conductivity of the conductive polymer component. When the ΔHSP1 is 10.5 $MPa^{0.5}$ or less (or 10 $MPa^{0.5}$ or less), the conductivity of the conductive polymer component further increases and the initial ESR can be further reduced.

The difference ΔHSP2 between the $HSP_p$ and the Hansen solubility parameter $HSP_f$ of the anode foil having the dielectric layer may be, for example, 10 $MPa^{0.5}$ or more and 16 $MPa^{0.5}$ or less. When the ΔHSP2 is 10 $MPa^{0.5}$ or more, affinity of the self-doped conductive polymer for the dielectric layer increases, and the self-doped conductive polymer is quickly fixed to the dielectric layer, to protect the anode foil. As a result, dissolution of components (such as aluminum) of the anode foil in the liquid component is suppressed, and corrosion can be suppressed. When the ΔHSP2 is 16 or less, the conductive polymer component easily penetrates into minute recesses formed in the anode foil having the dielectric layer, and thus it is easy to obtain a high capacity. From the viewpoint of further enhancing these effects, the ΔHSP2 may be 12.5 $MPa^{0.5}$ or more and 14.5 $MPa^{0.5}$ or less. The $HSP_p$ of the self-doped conductive polymer is usually larger than the $HSP_f$ of the anode foil having the dielectric layer. Therefore, the ΔHSP2 is expressed as ΔHSP2=$HSP_p$−$HSP_f$.

Note that the HSP of a target material is measured using the software "Hansen Solubility Parameters in Practice" (HSPiP), which uses a Hansen sphere method. With this method, the solubility of the target material in each of a plurality of solvents with known HSPs is examined through dissolution experiments. Thereafter, the HSPs of the solvents used in the dissolution experiments are plotted in the three-dimensional space (δd, δp, δh). Subsequently, the smallest sphere that encloses a group of HSPs of solvents in which the material is soluble, without including the HSPs of solvents in which the material is not soluble, is determined. Then, the central coordinates of the smallest sphere are taken to be the HSP of the target material.

For example, when the liquid component is constituted of only one solvent, the $HSP_e$ of the liquid component is calculated from material property values of the HSPiP software. When the liquid component is a mixed solvent or a solution containing a solute, solubility of the liquid component in each of a plurality of solvents (for example, 10 or more kinds of solvents) with known HSPs is examined, and the $HSP_e$ of the liquid component is calculated by the HSPiP software.

The $HSP_p$ of the self-doped conductive polymer is calculated using a predetermined amount (for example, 200 mg) of sample collected from a dried product obtained by removing volatile components from the self-doped conductive polymer by drying. More specifically, the solubility of the sample in each of a plurality of multiplsolvents (for example, 10 or more kinds of solvents) with known HSPs is examined, and the $HSP_p$ of the self-doped conductive polymer is calculated by the HSPiP software.

The $HSP_f$ of the anode foil having the dielectric layer is the literature value of the bulk of components of the dielectric layer. Alternatively, the anode foil having the dielectric layer is taken out, washed with ethanol, dried at 125° C. for 2 hours, and then the $HSP_f$ is determined using a sample obtained by collecting a surface layer portion. More specifically, the solubility of the sample in each of a plurality of solvents (for example, 10 or more kinds of solvents) with known HSPs is examined, and the $HSP_f$ of the anode foil having the dielectric layer is calculated using the HSPiP software. Note that when it is difficult to collect the surface layer portion, by using the above-described anode foil having the dielectric layer after drying, the solubility of the anode foil in each of a plurality of solvents is examined in the same manner as described above, and the $HSP_f$ is calculated using the HSPiP software. In this case, whether the dielectric layer dissolves in the solvent is determined according whether the dielectric layer has been removed, by reflection spectrometry.

The self-doped conductive polymer usually contains anionic groups. Examples of the anionic groups include sulfo group, carboxy group, phosphoric acid group, and a phosphonic acid group. In the conductive polymer component of the electrolytic capacitor, the anionic group of the self-doped conductive polymer may be contained in any form such as anion, free form, ester, or salt, and may be contained in a form that interacts with or is conjugated with a component contained in the conductive polymer component. In this specification, all of these forms are simply referred to as anionic groups.

The self-doped conductive polymer may contain one kind of anionic group, or may contain two or more kinds. From the viewpoint of easily ensuring higher conductivity of the self-doped conductive polymer, the self-doped conductive polymer may contain at least a sulfo group. However, the self-doped conductive polymer containing a sulfo group easily dissolves in the liquid component due to an action of the sulfo group, and tends to corrode the anode foil (such as an anode foil containing aluminum) and the like. However, in the present disclosure, even when the self-doped conductive polymer contains a sulfo group, since the ΔHSP1 is within a specific range, dissolution of the self-doped conductive polymer in the liquid component can be suppressed. Further, when the ΔHSP2 is within a specific range, corrosion of the anode foil can be suppressed.

The self-doped conductive polymer includes the skeleton of the conjugated polymer and anionic groups introduced into this skeleton. The skeleton of the self-doped conductive polymer can be said to be constituted of a conjugated polymer. The number of anionic groups contained in the self-doped conductive polymer is, for example, one or more and three or less, and may be two or one, for example, per molecule of the conjugated polymer constituting the skeleton of the self-doped conductive polymer.

Examples of the conjugated polymer constituting the skeleton of self-doped conductive polymers include polymers having a basic skeleton of polypyrrole, polythiophene, polyaniline, polyfuran, polyacetylene, polyphenylene, polyphenylenevinylene, polyacene, and polythiophenevinylene. The above polymers contain at least one kind of monomer unit constituting the basic skeleton. The above polymers also contain homopolymers, copolymers of two or more monomers, and derivatives thereof (such as substituted products having substituents). For example, polythiophenes include poly(3,4-ethylenedioxythiophene). The self-doped conductive polymer has anionic groups in the skeleton of these conjugated polymers. The anionic groups may be directly introduced into the skeleton of the conjugated polymer, or may be introduced via a linking group. The linking group is, for example, preferably a polyvalent group (divalent group) including an alkylene group. Examples of the linking group include aliphatic polyvalent groups (such as divalent groups) such as alkylene groups, and $—R^1—X—R^2—$ groups (X is an oxygen element or a sulfur element, and $R^1$ and $R^2$ are the same or different and are alkylene groups). The number of carbon atoms contained in each alkylene group in the linking group is, for example, 1 or more and 10 or less, and may be 1 or more and 6 or less. The alkylene group may be a straight chain or branched. From the viewpoint of easily balancing high swelling properties due to the liquid component and suppression of dissolution in the liquid component, the linking group preferably includes at least an alkylene group having 2 or more carbon atoms. The number of carbon atoms in such an alkylene group may be 2 or more (or 3 or more) and 10 or less, or may be 2 or more (or 3 or more) and 6 or less. For example, $R^1$ may be an alkylene group having 1 or more and 6 or less carbon atoms, and $R^2$ may be an alkylene group having 2 or more (or 3 or more) and 10 or less carbon atoms. However, the linking group is not limited to these.

The conjugated polymer constituting the skeleton of the self-doped conductive polymer may be polypyrrole, polythiophene, or polyaniline. From the viewpoint of easily obtaining high conductivity and stability, the self-doped conductive polymer is preferably a polymer having a skeleton of the conjugated polymer containing a monomer unit corresponding to a thiophene compound and an anionic group introduced into this skeleton.

Examples of the thiophene compound include compounds that have a thiophene ring and can form a repeating structure of monomer units corresponding to the thiophene ring. The thiophene compound can be linked at the 2- and 5-positions of the thiophene ring to form the repeating structure of the monomer units.

The thiophene compound may have a substituent at, for example, at least one of the 3- and 4-positions of the thiophene ring. The substituent at the 3-position and the substituent at the 4-position may be linked to form a ring condensed to the thiophene ring. Examples of the thiophene compound include thiophenes and alkylenedioxythiophene compounds (for example, $C_{2-4}$ alkylenedioxythiophene compounds such as ethylenedioxythiophene compounds) that may have a substituent at at least one of the 3- and 4-positions. Alkylenedioxythiophene compounds also include compounds having a substituent in an alkylene group portion.

Preferred examples of the substituent include, but are not limited to, alkyl groups (for example, $C_{1-4}$ alkyl groups such as methyl and ethyl), alkoxy groups (for example, $C_{1-4}$ alkoxy groups such as methoxy and ethoxy), hydroxy groups, and hydroxyalkyl groups (for example, hydroxy $C_{1-4}$ alkyl groups such as hydroxymethyl). When the thiophene compound has two or more substituents, respective substituents may be the same or different. The thiophene ring (at least one of the thiophene ring and the alkylene group, in the alkylenedioxythiophene ring) may have, as a substituent, the above-mentioned anionic group or a group (for example, a sulfoalkyl group) including an anionic group.

The self-doped conductive polymer may have a skeleton of a conjugated polymer (such as PEDOT) containing a monomer unit corresponding to at least a 3,4-ethylenedioxythiophene compound (such as 3,4-ethylenedioxythiophene (EDOT)). The skeleton of the conjugated polymer containing at least monomer units corresponding to EDOT may contain only monomer units corresponding to EDOT, or may contain, in addition to the monomer units, monomer units corresponding to thiophene compounds other than EDOT.

A weight average molecular weight (Mw) of the self-doped conductive polymer is not particularly limited, but is, for example, 1,000 or more and 1,000,000 or less, may be 1,000 or more and 100,000 or less, and may be 5,000 or more and 50,000 or less. A balance between suppression of dissolution of the self-doped conductive polymer and high conductivity may be adjusted by adjusting the ΔHSP1 according to the Mw of the self-doped conductive polymer used.

Note that in this specification, the weight average molecular weight (Mw) is a value calculated in terms of polystyrene measured by gel permeation chromatography (GPC). Note that GPC is usually measured using a polystyrene gel column and water/methanol (volume ratio 8/2) as a mobile phase.

The ratio of the self-doped conductive polymer contained in the conductive polymer component is, for example, 50 mass % or more, and may be 75 mass % or more, or may be 90 mass % or more. The ratio of the self-doped conductive polymer contained in the conductive polymer component is 100 mass % or less. When the ratio of the self-doped conductive polymer in the conductive polymer component is relatively high in this manner, it is easier to ensure high conductivity and high stability of the conductive polymer component. The conductive polymer component may be constituted only of the self-doped conductive polymer.

Examples of other conductive polymers (such as non-self-doped conductive polymers) contained in the conductive polymer component include the conjugated polymer (such as a non-self-doped conjugated polymer (for example, a conjugated polymer without anionic groups)) and the dopant. Examples of the conjugated polymers include the conjugated polymer exemplified as a conjugated polymer constituting a main skeleton of the self-doped conductive polymer. When the conjugated polymer and the conjugated polymer constituting the main skeleton of the self-doped conductive polymer have similar skeletons, high affinity is easily obtained. For example, the non-self-doped conjugated polymer containing a monomer unit of a thiophene compound may be combined with the self-doped conductive polymer having a main skeleton including a monomer unit of a thiophene compound. An example of a thiophene compound corresponding to a monomer unit of the non-self-doped conjugated polymer is the thiophene compound described for the self-doped conductive polymer.

Examples of the dopant include at least one selected from the group consisting of anions and polyanions (such as polymer anions). Examples of the anions include sulfate ions, nitrate ions, phosphate ions, borate ions, organic sulfonate ions, and carboxylate ions. Examples of the dopant that generates sulfonate ions include p-toluenesulfonic acid and naphthalenesulfonic acid. The polymer anion may be used from the viewpoint of easily obtaining higher stability. Examples of the polymer anion having a sulfo group include polymer-type polysulfonic acid. Specific examples of the polymer anion include polyvinylsulfonic acid, polystyrene-sulfonic acid (PSS (including copolymers and substituted products having a substituent)), polyallylsulfonic acid, poly-acrylicsulfonic acid, polymethacrylicsulfonic acid, poly(2-acrylamido-2-methylpropanesulfonic acid), polyisoprene-sulfonic acid, polyestersulfonic acid (such as aromatic polyestersulfonic acid), and phenolsulfonic acid novolac resin. However, the dopant is not limited to these specific examples.

The conductive polymer component (conductive polymer layer) formed in layers may be a single layer or may be constituted of a plurality of layers. When the conductive polymer layer is constituted of a plurality of layers, the composition of the conductive polymer component (the kind and amount of the self-doped conductive polymer, the kind and amount of the conjugated polymer, the kind and amount of the dopant, the kind and amount of the additive, and the like) contained in each layer may be the same or different.

The conductive polymer component (or conductive polymer layer) is formed, for example, using a treatment liquid (also referred to as a liquid composition) containing a self-doped conductive polymer. For example, the anode foil having the dielectric layer, or a precursor of a capacitor element (for example, a wound body in which the anode foil having the dielectric layer and the cathode foil are wound with the separator therebetween) including the anode foil having the dielectric layer and the cathode body is immersed in the liquid composition and then dried to form the conductive polymer component (or the conductive polymer layer) in contact with the dielectric layer.

The self-doped conductive polymer may be dissolved in the liquid composition or may be dispersed in particulate form. The liquid composition may further contain another component (for example, another conjugated polymer, dopant, or additive).

The liquid composition can be obtained by, for example, polymerizing (for example, oxidative polymerization) a precursor of the self-doped conductive polymer in a liquid medium. Examples of the precursor include at least one selected from the group consisting of monomers constituting the self-doped conductive polymer, oligomers in which several monomers are linked together, and prepolymers. If necessary, at least one of the another conjugated polymer and dopant may be present together when preparing the liquid composition.

Examples of the liquid medium include water and organic liquid medium. The liquid medium is, for example, a medium that is liquid at room temperature (a temperature of 20° C. or higher and 35° C. or lower). Examples of the organic liquid medium include monohydric alcohols (methanol, ethanol, propanol, and the like), polyhydric alcohols (ethylene glycol, glycerin, and the like), and aprotic polar solvents (N,N-dimethylformamide, dimethyl sulfoxide, acetonitrile, acetone, benzonitrile, and the like). The liquid composition may contain one kind or two or more kinds of liquid medium.

When the liquid composition contains a particulate self-doped conductive polymer, the average particle diameter of the self-doped conductive polymer particles may be 100 nm or less, or may be 50 nm or less, from the viewpoint of easily filling the pores of the porous portion. The lower limit of the average particle diameter is not particularly limited, but is, for example, 0.5 nm or more or 5 nm or more. Note that the average particle diameter here means the median diameter (D50) in a volume-based particle size distribution. The average particle diameter of the self-doped conductive polymer can be determined, for example, from the particle size distribution by dynamic light scattering (DLS). Specifically, using an aqueous dispersion (for example, a liquid dispersion) containing particles of the self-doped conductive polymer, the particle size distribution of the particles is measured on a volume basis with a dynamic light scattering particle size analyzer (LB-550, manufactured by HORIBA, Ltd.), and the median diameter (D50) is taken as the average particle diameter.

(Cathode Body)

A metal foil (cathode foil) may be used for the cathode body. The kind of metal is not particularly limited, and for example, a valve metal such as aluminum, tantalum, or niobium, or an alloy containing a valve metal may be used. A surface of the metal foil may be roughened as necessary. The surface of the metal foil may be provided with a chemical conversion film, or may be provided with a film of a metal (dissimilar metal) different from the metal constituting the metal foil, or a non-metal. Examples of the dissimilar metal and the non-metal include metals such as titanium and non-metals such as carbon.

(Separator)

A separator may be placed between the cathode foil and the anode foil. The separator is not particularly limited, and for example, a nonwoven fabric containing fibers of cellulose, polyethylene terephthalate, vinylon, or polyamide (for example, aliphatic polyamide and aromatic polyamide such as aramid) may be used as the separator.

When the capacitor element includes the separator, the conductive polymer component may be impregnated in the separator. The conductive polymer component may be interposed between the anode foil and the cathode foil, and in contact with at least a portion of the dielectric layer and at least a portion of the cathode foil. In the present disclosure, by combining the self-doped conductive polymer with the liquid component, high conductivity of the conductive polymer component is obtained, so that even in these aspects, the initial ESR and the change in ESR over time can be kept low.

(Others)

The electrolytic capacitor may be of a wound type, and may be either chip type or laminated type. The electrolytic capacitor only needs to have at least one capacitor element, and may have a plurality of capacitor elements. For example, the electrolytic capacitor may have a laminate of two or more capacitor elements, or may have two or more wound type capacitor elements. The configuration and number of capacitor elements may be selected depending on the type, application, or the like of the electrolytic capacitor.

(Liquid Component)

The liquid component contains, for example, a non-aqueous solvent. The non-aqueous solvent is selected according to the $HSP_p$ of the self-doped conductive polymer so that the ΔHSP1 is in the above range. Examples of the non-aqueous solvent include alcohol-based solvents, sulfone compounds, lactone compounds, and carbonate compounds. The liquid component may contain one kind or a combination of two or more kinds of non-aqueous solvent.

The alcohol-based solvent includes monohydric alcohols and polyhydric alcohols. From the viewpoint of easily obtaining high repairability of the dielectric layer, the alcohol-based solvent may contain at least a polyhydric alcohol. Examples of the polyhydric alcohols include glycol compounds, glycerin compounds, and sugar alcohol compounds.

Examples of the glycol compounds include alkylene glycols, polyalkylene glycols, and alkylene oxide adducts of polyhydric alcohols. Examples of the alkylene glycols include ethylene glycol (EG), propylene glycol (PG), trimethylene glycol, butanediol, pentanediol, hexanediol, dihydroxyoctane, dihydroxynonane, and dihydroxydecane. The alkylene glycol may be either straight chain or branched. The number of carbon atoms in the alkylene glycol may be, for example, 2 or more and 10 or less. Examples of the polyalkylene glycols include poly $C_{2-4}$ alkylene glycols (for example, diethylene glycol, dipropylene glycol, triethylene glycol, polyethylene glycol (PEG), polypropylene glycol (PPG), polytrimethylene glycol, and polytetramethylene glycol). Examples of the alkylene oxide adducts of polyhydric alcohols include $C_{2-4}$ alkylene oxide adducts (such as ethylene oxide adducts and propylene oxide adducts) of polyhydric alcohols, including poly $C_{2-4}$ alkylene oxide adducts of polyhydric alcohols (such as polyethylene oxide adducts and propylene oxide adducts). Examples of the polyhydric alcohols to which alkylene oxide is added include alkylene glycols (for example, alkylene glycols having 4 or more carbon atoms) having alkylene moiety structure different from that of alkylene moiety of the alkylene oxide, trimethylolpropane, as well as sugar alcohols (such as glycerin, erythritol, mannitol, and pentaerythritol). The number of repeating oxyalkylene units in the polyalkylene glycol is, for example, 2 or more and 600 or less, may be 2 or more and 10 or less, or may be more than 10 and 600 or less (for example, 100 or more and 600 or less). The number of alkylene oxide units in the alkylene oxide adduct may be 1 or more, and the total number of alkylene oxide units may be 2 or more. The total number of repeating alkylene oxide units in the alkylene oxide adduct may be 2 or more and 50 or less, or may be 2 or more and 20 or less.

Examples of the glycerin compounds include glycerin and polyglycerin (such as diglycerin and triglycerine). The number of repeating glycerin units in polyglycerin is, for example, 2 or more and 20 or less, and may be 2 or more and 10 or less. Examples of the sugar alcohol compounds include sugar alcohols (such as erythritol, mannitol, and pentaerythritol).

Examples of the sulfone compounds include sulfolane (SL), dimethyl sulfoxide, and diethyl sulfoxide. Examples of the lactone compounds include γ-butyrolactone (GBL) and γ-valerolactone. Examples of the carbonate compounds include dimethyl carbonate, diethyl carbonate, ethyl methyl carbonate, ethylene carbonate, propylene carbonate, and fluoroethylene carbonate.

From the viewpoint of easily adjusting the ΔHSP1 to the above range and easily suppressing dissolution of the self-doped conductive polymer in the liquid component, the non-aqueous solvent preferably contains at least a glycol compound. Among them, for example, at least one (hereinafter sometimes referred to as a first solvent) selected from the group consisting of alkylene glycols having 4 or more carbon atoms and polyalkylene glycols having 3 or more carbon atoms in the alkylene moiety is preferable. The polyalkylene glycols also include copolymers having two or more kinds of oxyalkylene units, adducts in which alkylene glycol is added with alkylene oxide having 3 or more carbon atoms (however, alkylene moiety of the alkylene glycol and alkylene moiety of the alkylene oxide have different structures), and the like. The alkylene moiety contained in the glycol compounds may be straight chain or branched.

Examples of the alkylene glycols having 4 or more carbon atoms include butanediols (such as 1,2-butanediol, 1,3-butanediol, 2,3-butanediol, and 1,4-butanediol), pentanediols (such as 1,2-pentanediol, 1,3-pentanediol, 1,4-pentanediol, 2,4-pentanediol, and 1,5-pentanediol), hexanediols (such as 3-methyl-2,4-pentanediol, 1,2-hexanediol, 1,3-hexanediol, 1,4-hexanediol, and 1,6-hexanediol), dihydroxyoctanes (such as 2-ethyl-1,3-hexanediol, 1,2-dihydroxyoctane, and 1,8-dihydroxyoctane), dihydroxynonanes (such as 2-methyl-1,8-dihydroxyoctane and 1,9-nonanediol), and dihydroxydecane. The number of carbon atoms in the alkylene glycol may be 4 or more and 10 or less, or may be 4 or more and 8 or less. From the viewpoint of easily adjusting the ΔHSP1, as well as easily swelling the conductive polymer component and easily obtaining a higher capacity, the number of carbon atoms in the alkylene glycol may be 4 or more and 6 or less. Each of two hydroxyl groups in the alkylene glycol may be bonded to any of a primary carbon atom, a secondary carbon atom, and a tertiary carbon atom contained in the alkylene moiety. The alkylene glycol may have a structure in which at least one carbon atom is interposed between carbon atoms to which the hydroxyl groups are respectively bonded. In this case, the dipole-dipole force term δp increases, and a swelling effect of the conductive polymer component is further enhanced, so that the conductivity can be further improved.

The polyalkylene glycol having 3 or more carbon atoms in the alkylene moiety has a repeating structure of oxyalkylene having 3 or more carbon atoms (such as oxy $C_{3-4}$ alkylene), and may have the repeating structure of oxyalkylene having 3 or more carbon atoms (such as oxy $C_{3-4}$ alkylene) and a repeating structure of oxyethylene. The number of carbon atoms in the oxyalkylene may be 6 or less, or may be 4 or less. The ratio of oxyalkylene units having 3 or more carbon atoms (such as oxy $C_{3-4}$ alkylene units) to the total monomer units constituting the polyalkylene glycol may be 50 mol % or more, 70 mol % or more, or 90 mol % or more. Examples of such polyalkylene glycols include PPG, polytetramethylene glycol, polybutylene glycol (such as poly $C_{3-4}$ alkylene glycol), polyoxyethylene-polyoxypropylene copolymers (such as copolymers containing oxypropylene units at 50 mol % or more of all monomer units), propylene oxide adducts of ethylene glycol, propylene oxide adducts of alkylene glycols having 4 or more carbon atoms, butylene oxide adducts of $C_{2-3}$ alkylene glycols, and butylene oxide adducts of alkylene glycols having 5 or more carbon atoms. The number of carbon atoms in the alkylene glycol to which the alkylene oxide is added is, for example, 10 or less, and may be 8 or less, or 6 or less. The number of repeating oxyalkylene units in the polyalkylene glycol, the number of alkylene oxide units in an added portion of the alkylene oxide adduct, or the total number of repeating alkylene oxide units in the added portion can each be selected from the above-mentioned ranges.

The Mw of the polyalkylene glycol is, for example, 1000 or less, and may be 150 or more (or 200 or more) and 1000 or less, or may be 150 or more (or 200 or more) and 700 or less. When the Mw of the polyalkylene glycol is in such a range, it is easy to adjust the ΔHSP1 to the above range, and an effect of suppressing dissolution of the self-doped conductive polymer in the liquid component is enhanced.

The liquid component may contain one kind of the first solvent, or may contain two or more kinds in combination. The liquid component may contain the first solvent and a non-aqueous solvent (hereinafter referred to as a second solvent) other than the first solvent. Examples of the second solvent include the above-mentioned non-aqueous solvent other than the first solvent, specifically at least one selected from the group consisting of alcohol-based solvents other than the first solvent, sulfone compounds, lactone compounds, and carbonate compounds. From the viewpoint of easily adjusting the ΔHSP1 to the above range and enhancing the effect of suppressing dissolution of the self-doped conductive polymer, the ratio of the first solvent to the non-aqueous solvent contained in the liquid component is preferably 50 mass % or more, and more preferably 75 mass % or more or 90 mass % or more. The ratio of the first solvent to the non-aqueous solvent is 100 mass % or less. The non-aqueous solvent may be constituted of only the first solvent.

The content rate of the first solvent in the liquid component is, for example, 30 mass % or more, and may be 50 mass % or more or 55 mass % or more. When the content rate of the first solvent is in such a range, it is easy to adjust the ΔHSP1 to the above range, and the effect of suppressing dissolution of the self-doped conductive polymer in the liquid component is further enhanced. The content rate of the first solvent in the liquid component may be 100 mass % or less, and may be, for example, 85 mass % or less or 75 mass % or less, taking into account concentrations of solutes, additives, and the like. These lower limit values and upper limit values can be combined arbitrarily. The content rate of the first solvent in the liquid component may be, for example, 30 mass % or more and 100 mass % or less, and may be 50 mass % or more (or 55 mass % or more) and 100 mass % or less. Within these ranges, the upper limit value may be changed to the above range.

When the liquid component contains the first solvent and the second solvent, using the second solvent containing at least one selected from the group consisting of sulfone compounds and lactone compounds is advantageous in terms of suppressing the change in ESR over time compared to using an alcohol-based second solvent.

Qualitative and quantitative analysis of each solvent in the non-aqueous solvent can be performed using GC-MS analysis with liquid components. GC-MS analysis may be performed under the following conditions.

Apparatus: GCMS-QP2010 (Shimadzu Corporation)

Sample volume: 1 μL

Column: DB-WAX (length 30 m, inner diameter 0.25 mm, adsorbent film thickness 0.25 μm, upper heat resistance temperature 260° C.)

Heating flow: hold at 50° C. for 1 min→heat to 250° C. at 10° C./min→hold at 250° C. for 20 min Ion source temperature setting: 200° C.

Interface temperature: 250° C.

(Solute)

The liquid component may contain the solute. Examples of the solute include acid components and base components.

Examples of the acid components include acids having a carbonyloxy bond (such as carboxylic acid, oxocarbonic acid, and Meldrum's acid), coordination compounds of acids or phenolic compounds having a carbonyloxy bond, phenolic compounds (such as picric acid, p-nitrophenol, pyrogallol, and catechol), sulfur-containing acids (such as sulfuric acid, sulfonic acids (such as aromatic sulfonic acids), and oxyaromatic sulfonic acids (such as phenol-2-sulfonic acid)), compounds having a sulfonylimide bond, boron-containing acids (such as boric acid, halogenated boric acids (such as tetrafluoroboric acid), and partial esters thereof), phosphorus-containing acids (such as phosphoric acid, halogenated phosphoric acids (such as hexafluorophosphoric acid), phosphonic acids, phosphinic acids, and partial esters thereof), nitrogen-containing acids (such as nitric acid and nitrous acid), and p-nitrobenzene. Examples of the carboxylic acids include aliphatic carboxylic acids and aromatic carboxylic acids (including sulfoaromatic carboxylic acids (such as p-sulfobenzoic acid, 3-sulfophthalic acid, and 5-sulfosalicylic acid)). Aromatic carboxylic acids (particularly, aromatic hydroxy acids (such as benzoic acid and salicylic acid) and aromatic polycarboxylic acids (such as phthalic acid and pyromellitic acid)) are preferred due to their high stability. Examples of the compounds having a sulfonylimide bond include saccharin, 1,2-benzenedisulfonimide, cyclohexafluoropropane-1,3-bis(sulfonyl)imide, 4-methyl-N-[(4-methylphenyl) sulfonyl]benzenesulfonamide, dibenzenesulfonimide, trifluoromethanesulfonanilide, N-[(4-methylphenyl) sulfonyl]acetamide, benzenesulfonanilide, and N,N'-diphenylsulfamide. Examples of the coordination compounds include coordination compounds having at least one central atom selected from the group consisting of boron, aluminum, and silicon, and an acid having a carbonyloxy bond bound to this central atom. Specific examples of the coordination compounds include borodisalicylic acid, borodisalic acid, borodiglycolic acid, borodigallic acid, borodicatechol, and borodipyrogallol. The liquid component may contain one or more acid components. Among the acid components, aromatic carboxylic acids (such as phthalic acid, salicylic acid, and benzoic acid) and the above-mentioned coordination compounds (such as borodisalicylic acid, borodisalic acid, and borodiglycolic acid) are preferred, and among them, phthalic acid, salicylic acid, borodisalicylic acid, and the like are preferred.

The acid component may be contained in the liquid component in a free form, in an anionic form, or in the form of a salt. All of the forms may be referred to as the acid component. The liquid component may contain the base component in addition to the acid component. The base component neutralizes at least a portion of the acid component. Therefore, it is possible to increase a concentration of the acid component while suppressing corrosion of electrodes caused by the acid component.

Examples of the base components include ammonia, amines (specifically, primary amines, secondary amines, and tertiary amines), quaternary ammonium compounds, and amidinium compounds. The liquid component may contain one kind or two or more kinds of base component.

The amine may be any of aliphatic, aromatic, and heterocyclic. Examples of the amine include, for example, trimethylamine, diethylamine, ethyldimethylamine, triethylamine, ethylenediamine, aniline, pyrrolidine, imidazole (such as 1,2,3,4-tetramethylimidazolinium), and 4-dimethylaminopyridine. Examples of the quaternary ammonium compounds include amidine compounds (including imidazole compounds).

The liquid component may contain the base component in a free form, in a cationic form, or in the form of a salt. All of the forms included in the base component and are sometimes referred to as the base component.

The molar ratio of the total amount of the acid components to the base components (=acid components/base components) may be, for example, 0.5 or more (or 1 or more) and 50 or less, or may be 1.1 or more (or 1.5 or more) and 20 or less.

From the viewpoint of more easily suppressing dissolution of the self-doped conductive polymer, pH of the liquid component may be 1 or more and 4 or less, or may be 1 or more and 3.5 or less.

From the viewpoint of ensuring high dissociation properties of the solute in the liquid component and easily obtaining high film repair properties of the dielectric layer, the concentration of the solute in the liquid component may be 0.1 mass % or more and 25 mass % or less, or may be 0.5 mass % or more and 25 mass % or less (or 15 mass % or less). Note that the concentration of the acid component is calculated in terms of free acid, not anion or salt. Similarly, the concentration of the base component is calculated in terms of free base, not cation or salt.

(Others)

In the capacitor element, one end of a cathode lead terminal is electrically connected to the cathode body. One end of an anode lead terminal is electrically connected to the anode body. Each lead terminal may be, for example, joined to the electrode (such as the metal foil) by welding, or may be joined to the electrode via a conductive adhesive.

An electrolytic capacitor is prepared by housing the capacitor element and the liquid component in a case or an exterior body. For example, the electrolytic capacitor may be formed by housing the capacitor element and the liquid component in a bottomed case and sealing an opening of the bottomed case with a sealing body. At this time, the other end of the anode lead terminal and the other end of the cathode lead terminal are each pulled out from the case or the exterior body. The other end of each terminal exposed from the case or the exterior body is used for, for example, soldering to a substrate on which the electrolytic capacitor is to be mounted. The electrolytic capacitor of the present disclosure will be described in more detail below based on an embodiment. However, the electrolytic capacitor of the present disclosure is not limited to the following embodiment.

Figure 2:
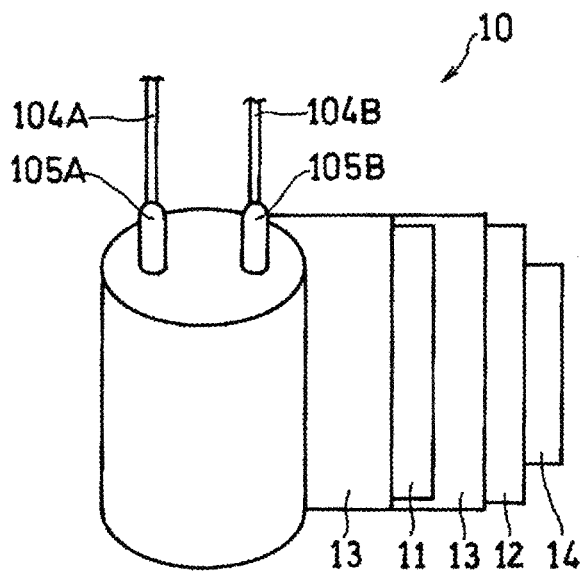
FIG. 2 is a schematic view illustrating a partially unwound capacitor element of the electrolytic capacitor of FIG. 1.

FIG. 1 is a schematic sectional view of the electrolytic capacitor according to the present embodiment, and FIG. 2 is a schematic view illustrating a partially developed capacitor element of the electrolytic capacitor.

The electrolytic capacitor includes, for example, a capacitor element 10, a bottomed case 101 that houses the capacitor element 10 and the liquid component (not illustrated), a sealing member 102 that closes the opening of the bottomed case 101, a seat plate 103 that covers the sealing member 102, lead wires 104A and 104B that are led out from the sealing member 102 and penetrate the seat plate 103, and lead tabs 105A and 105B that connect the lead wires to the electrodes of the capacitor element 10. The region around the open end of the bottomed case 101 is drawn inward, and the open end is curled so as to be crimped to the sealing member 102.

The capacitor element 10 is, for example, the wound body as illustrated in FIG. 2. The wound body includes an anode foil 11 connected to the lead tab 105A, a cathode foil 12 connected to the lead tab 105B, and a separator 13. The anode foil 11 and the cathode foil 12 are wound with the separator 13 interposed therebetween. The outermost peripheral portion of the wound body is fixed with a winding stop tape 14. Note that FIG. 2 illustrates a partially unwound state of the wound body before the outermost circumference is fixed.

In the capacitor element 10, the dielectric layer (not illustrated) is formed on at least a portion of the surface of the anode foil 11. The separator 13 and the conductive polymer component (not illustrated) are interposed between the anode foil 11 and the cathode foil 12. The conductive polymer component is in contact with at least a portion of the dielectric layer. Further, the conductive polymer component is in contact with at least a portion of the cathode foil 12. Then, the conductive polymer component and the separator are impregnated with the liquid component.

EXAMPLES

The present invention will be described in detail below with reference to Examples and Comparative Examples, but the present invention is not limited to the following examples.

<<Preparation of Electrolytic Capacitors E1 to E7 and C1 to C4>>

Wound-type electrolytic capacitors (diameter 8 mm, length 10 mm) with a rated voltage of 35 V and a rated capacitance of 150 μF were prepared. A specific manufacturing method of the electrolytic capacitor will be described below.

(Preparation of Anode Foil)

Aluminum foil with a thickness of 100 μm was etched to roughen a surface of the aluminum foil. Thereafter, the dielectric layer was formed on the surface of the aluminum foil by the chemical conversion treatment. The chemical conversion treatment was performed by immersing the aluminum foil in an ammonium adipate solution and applying a voltage of 60 V to the aluminum foil. Thereafter, the aluminum foil was cut to prepare the anode foil.

(Preparation of Cathode Foil)

18

Aluminum foil with a thickness of 50 μm was etched to roughen the surface of the aluminum foil. Thereafter, the aluminum foil was cut to prepare the cathode foil.

(Preparation of Wound Body)

An anode lead tab and a cathode lead tab were respectively connected to the anode foil and the cathode foil, and the anode foil and the cathode foil were wound with the separator interposed therebetween while the lead tabs were rolled therein. An anode lead wire and a cathode lead wire were respectively connected to ends of the lead tabs protruding from the wound body. The prepared wound body was subjected to the chemical conversion treatment again, and the dielectric layer was formed on a cut end of the anode foil. Subsequently, an end of an outer surface of the wound body was fixed with the winding stop tape to prepare the wound body.

(Preparation of Liquid Composition)

An aqueous dispersion (liquid composition) containing a self-doped polythiophene-based polymer was prepared. The concentration of the polythiophene-based polymer in the liquid composition was set to 4 mass %. Polythiophene-based polymer particles were very small with a particle diameter of less than 1 nm. As the self-doped polythiophene-based polymer, PEDOT (Mw: approximately 10,000) having a sulfo group bonded to a PEDOT skeleton via a linking group including a butylene group was used.

Note that in Comparative Example 4, an aqueous dispersion (concentration 4 mass %) containing PEDOT doped with PSS was used instead of the aqueous dispersion containing the self-doped polythiophene-based polymer.

(Formation of Solid Electrolyte)

The wound body was immersed in a liquid mixture contained in a predetermined container in a reduced pressure atmosphere (40 kPa) for 5 minutes, and then the wound body was lifted out of the liquid mixture. Subsequently, by drying the wound body impregnated with the liquid mixture in a drying oven at 150° C. for 20 minutes, the conductive polymer component (solid electrolyte) containing the self-doped polythiophene-based polymer was placed between the anode foil having the dielectric layer and the cathode foil. The conductive polymer component is in contact with at least a portion of the dielectric layer and at least a portion of the cathode foil, and is impregnated in the separator. The capacitor element was thus formed.

(Assembly of Electrolytic Capacitor)

The solvents shown in Table 1 were used as liquid components. The above-mentioned wound body in which the conductive polymer component (solid electrolyte) was formed was immersed in the liquid component for 5 minutes in a reduced pressure atmosphere (40 kPa). Thus, the capacitor element impregnated with the liquid component was obtained. The obtained capacitor element was housed in the case, and the opening of the case was sealed with the sealing body. In this way, the electrolytic capacitor illustrated in FIG. 1 was completed. Thereafter, an aging treatment was performed at 130° C. for 2 hours while applying the rated voltage to the electrolytic capacitor. An elastic member containing butyl rubber was used as the sealing body.

[Evaluation: Measurement of ESR and Capacitance]

In an environment of 20° C., an ESR (mΩ) at a frequency of 100 kHz and a capacitance (μF) at a frequency of 120 Hz were measured for each electrolytic capacitor using an LCR meter for 4-terminal measurement. Then, the average value of the ESR (initial ESR) and the average value of capacitance Cap (initial Cap) for 20 electrolytic capacitors were determined.

Subsequently, the electrolytic capacitor was placed in a thermostatic chamber in an atmosphere of 145° C. and held for 500 hours with the rated voltage applied, to conduct an accelerated test. Thereafter, the ESR and Cap were measured in a 20° C. environment using the same procedure in the case of the initial ESR and Cap, and an average value (ESR and Cap after the accelerated test) of 20 solid electrolytic capacitors were determined. The ESR after the accelerated test was measured, to determine a change difference value from the initial ESR (ΔESR=ESR after accelerated test−initial ESR). Further, the ratio of the Cap after the accelerated test to the initial Cap (=Cap after accelerated test/initial Cap×100(%)) was determined as a Cap change rate. The Cap change rate is an index of a change in the Cap over time. The initial ESR, the ESR after the accelerated test, and the Cap change rate after the accelerated test are each shown as a ratio when a value in Comparative Example 1 is 100.

Evaluation results are shown in Table 1. In the table, E1 to E7 are Examples, and C1 to C4 are Comparative Examples.

TABLE 1

| | Conductive polymer component | Liquid component | ΔHSP1 (MPa^0.5) | ΔHSP2 (MPa^0.5) | Initial ESR | ΔESR after accelerated test | Cap change rate after accelerated test |
|---|---|---|---|---|---|---|---|
| C1 | Shelf-doped | Ethylene glycol | 2.3 | 13.1 | 1745 | 1210 | 100 |
| C2 | Shelf-doped | Diethylene glycol | 8.5 | 13.1 | 100 | 100 | 100 |
| C3 | Shelf-doped | γ-butyrolactone | 13 | 13.1 | 55 | 4 | 100 |
| E1 | Shelf-doped | PEG | 9.0 | 13.1 | 22 | 7 | 100 |
| E2 | Shelf-doped | PPG | 9.6 | 13.1 | 16 | 4 | 100 |
| E3 | Shelf-doped | 1,3-butanediol | 11.4 | 13.1 | 29 | 4 | 100 |
| E4 | Shelf-doped | PPG | 9.6 | 5 | 16 | 4 | 91 |
| E5 | Shelf-doped | PPG | 9.6 | 10 | 16 | 4 | 100 |
| E6 | Shelf-doped | PPG | 9.6 | 16 | 16 | 4 | 100 |
| E7 | Shelf-doped | PPG | 9.6 | 20 | 16 | 4 | 94 |
| C4 | PEDOT + PSS | PPG | 9.6 | 13.1 | 73 | 21 | 88 |

PEG: Polyethylene glycol (Mw = 200)
PPG: Polypropylene glycol (Mw = 400)

As shown in Table 1, when the ΔHSP1 was less than 9.0 MPa^0.5, both the initial ESR and the ESR after the accelerated test (that is, ΔESR) were very large values. This is thought to be because the conductive polymer component dissolves in the liquid component from an initial stage, the conductivity of the conductive polymer component is reduced, and the conductive polymer component continues to dissolve in the liquid component even during the accelerated test, and thus the conductivity is reduced. Further, when $\Delta HSP1$ is more than 11.4 $MPa^{0.5}$, the $\Delta ESR$ was kept low, but the initial ESR was high. This is thought to be because the conductive polymer component was not easily swollen by the liquid component, and thus the conductivity of the conductive polymer component was low.

In contrast, in Examples where the $\Delta HSP1$ is 9.0 $MPa^{0.5}$ or more and 11.4 $MPa^{0.5}$ or less, both the initial ESR and the ESR ($\Delta ESR$) after the accelerated test are kept low. This is thought to be because the conductive polymer component is sufficiently swollen by the liquid component, the high conductivity is obtained, and dissolution of the conductive polymer component in the liquid component during the accelerated test is suppressed. On the other hand, even when the $\Delta HSP1$ is 9.0 $MPa^{0.5}$ or more and 11.4 $MPa^{0.5}$ or less, in C4 where the conductive polymer component does not contain the self-doped conductive polymer, the initial ESR and the $\Delta ESR$ are kept low compared to C1 and C2, but the $\Delta ESR$ and a capacity change rate are insufficient compared to E1 to E7. The reason why the $\Delta ESR$ is large and the capacity change rate is low in C4 compared to E1 to E7 is thought to be because de-doping occurs by the accelerated test, and thus the conductive polymer deteriorates and the conductivity of the solid electrolyte layer decreases.

Further, in Examples, when the $\Delta HSP2$ is 10 $MPa^{0.5}$ or more and 16 $MPa^{0.5}$ or less, a high capacity is obtained even after the accelerated test. This is thought to be because the conductive polymer component easily penetrates into minute recesses in the surface of the dielectric layer, and dissolution of the conductive polymer component during the accelerated test is suppressed.

Although the present invention has been described with respect to a presently preferred embodiment, such disclosure should not be interpreted as limiting. Various modifications and variations will no doubt be apparent to those skilled in the art to which the present invention pertains upon reading the above disclosure. It is therefore intended that the appended claims be interpreted as including all such modifications and variations without departing from the true spirit and scope of the present invention.

INDUSTRIAL APPLICABILITY

The electrolytic capacitor of the present disclosure can be used as a hybrid electrolytic capacitor. The electrolytic capacitor has a small change in ESR over time and is excellent in reliability. Therefore, the electrolytic capacitor is particularly suitable for applications requiring high reliability. However, the applications of the electrolytic capacitor are not limited to these.

REFERENCE SIGNS LIST

100: electrolytic capacitor, 101: bottomed case, 102: sealing body, 103: seat plate, 104A, 104B: lead wire, 105A, 105B: lead tab, 10: capacitor element, 11: anode foil, 12: cathode foil, 13: separator, 14: winding stop tape

The invention claimed is:

1. An electrolytic capacitor comprising a capacitor element and a liquid component, wherein the capacitor element includes an anode foil having a dielectric layer on a surface of the anode foil, and a conductive polymer component in contact with at least a portion of the dielectric layer, the conductive polymer component contains a self-doped conductive polymer, and a difference $\Delta HSP1$ between a Hansen solubility parameter $HSP_p$ of the self-doped conductive polymer and a Hansen solubility parameter $HSP_e$ of the liquid component is 9.0 $MPa^{0.5}$ or more and 11.4 $MPa^{0.5}$ or less.

2. The electrolytic capacitor according to claim 1, wherein a difference $\Delta HSP2$ between the Hansen solubility parameter $HSP_p$ and a Hansen solubility parameter $HSP_f$ of the anode foil having the dielectric layer is 10 $MPa^{0.5}$ or more and 16 $MPa^{0.5}$ or less.

3. The electrolytic capacitor according to claim 2, wherein the anode foil contains aluminum.

4. The electrolytic capacitor according to claim 1, wherein the self-doped conductive polymer contains at least a sulfo group.

5. The electrolytic capacitor according to claim 1, wherein the capacitor element includes a cathode foil and a separator interposed between the anode foil and the cathode foil, and the conductive polymer component is impregnated in the separator.

* * * * *